(12) United States Patent
Raber et al.

(10) Patent No.: US 10,804,063 B2
(45) Date of Patent: Oct. 13, 2020

(54) MULTI-LAYER X-RAY SOURCE FABRICATION

(71) Applicant: General Electric Company, Schenectady, NY (US)

(72) Inventors: Thomas Robert Raber, East Berne, NY (US); Vance Scott Robinson, Schenectady, NY (US); Yong Liang, Niskayuna, NY (US)

(73) Assignee: Baker Hughes, a GE Company, LLC, Houston, TX (US)

(*) Notice: Subject to any disclaimer, the term of this patent is extended or adjusted under 35 U.S.C. 154(b) by 269 days.

(21) Appl. No.: 15/266,636

(22) Filed: Sep. 15, 2016

(65) Prior Publication Data

US 2018/0075998 A1 Mar. 15, 2018

(51) Int. Cl.
*H01J 35/08* (2006.01)
*B32B 15/20* (2006.01)
(Continued)

(52) U.S. Cl.
CPC .............. *H01J 35/08* (2013.01); *B32B 7/02* (2013.01); *B32B 7/04* (2013.01); *B32B 7/10* (2013.01); *B32B 7/12* (2013.01); *B32B 9/007* (2013.01); *B32B 9/04* (2013.01); *B32B 9/041* (2013.01); *B32B 15/04* (2013.01); *B32B 15/20* (2013.01); *H01J 35/108* (2013.01); *H01J 35/12* (2013.01); *B32B 37/06* (2013.01); *B32B 2255/00* (2013.01); *B32B 2307/302* (2013.01); *B32B 2307/40* (2013.01); *B32B 2307/732* (2013.01); *B32B 2309/022* (2013.01); *B32B 2311/00* (2013.01); *B32B 2313/04* (2013.01);
(Continued)

(58) Field of Classification Search
CPC .............. H01J 35/108; H01J 2235/084; H01J 2235/088; B32B 15/04; B32B 15/043
See application file for complete search history.

(56) References Cited

U.S. PATENT DOCUMENTS 3,869,634 A 3/1975 Konieczynski et al.
4,531,227 A * 7/1985 Fukuhara .............. H01J 35/108
378/125
(Continued)

FOREIGN PATENT DOCUMENTS

CN 204094143 U 1/2015
EP 0249141 A2 12/1987
(Continued)

OTHER PUBLICATIONS

International Invitation to Pay Additional Fees issued in connection with corresponding PCT Application No. PCT/US2017/051359 dated Feb. 13, 2018.
(Continued)

*Primary Examiner* — Scott W Dodds
(74) *Attorney, Agent, or Firm* — Mintz Levin Cohn Ferris Glovsky and Popeo, P.C.

(57) ABSTRACT

Fabrication of a multi-layer X-ray source is disclosed using bulk structures to fabricate a multi-layer target structure. In one implementation, layers of X-ray generating material, such as tungsten, are interleaved with thermally conductive layers, such as diamond layers. To prevent delamination of the layers, various mechanical, chemical, and/or structural approaches may also be employed.

11 Claims, 4 Drawing Sheets

(51) Int. Cl.

| | | |
|---|---|---|
| *B32B 9/04* | (2006.01) | |
| *B32B 7/12* | (2006.01) | |
| *H01J 35/10* | (2006.01) | |
| *H01J 35/12* | (2006.01) | |
| *B32B 7/04* | (2019.01) | |
| *B32B 7/02* | (2019.01) | |
| *B32B 7/10* | (2006.01) | |
| *B32B 9/00* | (2006.01) | |
| *B32B 15/04* | (2006.01) | |
| *B32B 37/06* | (2006.01) | |

(52) U.S. Cl.
CPC ..... *B32B 2457/00* (2013.01); *H01J 2235/084* (2013.01); *H01J 2235/088* (2013.01); *H01J 2235/1291* (2013.01)

(56) References Cited

U.S. PATENT DOCUMENTS

| | | | | |
|---|---|---|---|---|
| 4,641,334 A | * | 2/1987 | Devine, Jr. | ........... H01J 35/108 378/127 |
| 4,802,196 A | * | 1/1989 | Tiearney, Jr. | ........ B23K 35/322 378/125 |
| 4,972,449 A | * | 11/1990 | Upadhya | ............... H01J 35/108 378/143 |
| 5,006,505 A | * | 4/1991 | Skertic | .................... H01L 35/18 136/203 |
| 6,071,389 A | | 6/2000 | Zhang | |
| 6,463,123 B1 | * | 10/2002 | Korenev | ................... G21K 5/10 378/119 |
| 7,359,487 B1 | * | 4/2008 | Newcome | ............... H01J 35/08 378/119 |
| 8,123,107 B2 | | 2/2012 | Koenigsmann et al. | |
| 2001/0021239 A1 | * | 9/2001 | Itoga | ................... G03F 7/70008 378/34 |
| 2006/0065517 A1 | | 3/2006 | Ivanov et al. | |
| 2009/0129551 A1 | * | 5/2009 | Butler | ..................... H01J 35/12 378/143 |
| 2013/0064338 A1 | | 3/2013 | Matsumoto et al. | |
| 2013/0188774 A1 | * | 7/2013 | Ogura | ..................... H01J 35/08 378/62 |
| 2015/0247811 A1 | * | 9/2015 | Yun | ...................... G01N 23/223 378/45 |
| 2016/0233142 A1 | * | 8/2016 | Xu | ...................... H01L 23/3732 |

FOREIGN PATENT DOCUMENTS

| | | |
|---|---|---|
| WO | 2000006793 A1 | 2/2000 |
| WO | 2010/102896 A1 | 9/2010 |

OTHER PUBLICATIONS

International Search Report and Written Opinion issued in connection with corresponding PCT Application No. PCT/US2017/051359 dated Apr. 5, 2018.

Dalakos et al., "Multiplayer X-ray source target" GE co-pending U.S. Appl. No. 14/982,745, filed Dec. 29, 2015.

* cited by examiner

MULTI-LAYER X-RAY SOURCE FABRICATION

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A variety of medical diagnostic, laboratory, security screening, and industrial quality control imaging systems, along with certain other types of systems (e.g., radiation-based treatment systems), utilize X-ray tubes as a source of radiation during operation. Typically, the X-ray tube includes a cathode and an anode. An electron beam emitter within the cathode emits a stream of electrons toward an anode that includes a target that is impacted by the electrons.

A large portion of the energy deposited into the target by the electron beam produces heat within the target, with another portion of the energy resulting in the production of X-ray radiation. Indeed, only about 1% of the energy from the electron beam X-ray target interaction is responsible for X-ray generation, with the remaining 99% resulting in heating of the target. The X-ray flux is, therefore, highly dependent upon the amount of energy that can be deposited into the source target by the electron beam within a given period of time. However, the relatively large amount of heat produced during operation, if not mitigated, can damage the X-ray source (e.g., melt the target). Accordingly, conventional X-ray sources are typically cooled by either rotating or actively cooling the target. However, when rotation is the means of avoiding overheating, the amount of deposited heat along with the associated X-ray flux is limited by the rotation speed (RPM), target heat storage capacity, radiation and conduction cooling capability, and the thermal limit of the supporting bearings. Tubes with rotating targets also tend to be larger and heavier than stationary target tubes. When the target is actively cooled, such cooling generally occurs relatively far from the electron beam impact area, which in turn significantly limits the electron beam power that can be applied to the target. In both situations, the restricted heat removal ability of the cooling methods markedly lowers the overall flux of X-rays that are generated by the X-ray tube.

With this in mind, certain approaches may employ a layered X-ray source configuration, where layers of X-ray generating material are interleaved with layers of heat-conductive material to facilitate heat dissipation. One example may be a multi-layer diamond tungsten structure, where the tungsten generates X-rays when impacted by an electron beam and the diamond conducts heat away. Such a multilayer tungsten-diamond target structure is capable of producing high X-ray flux density due suitable heat dissipation, and is consequently able to withstand higher electron-beam irradiation than a conventional target structure. However, such a multi-layer structure may suffer from delamination of the layers in an operational setting. For example, adhesion between the X-ray generating and heat conducting layers may be inadequate during operation due to insufficient interfacial chemical bonding between layers.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a method of fabricating a multi-layer source target for X-ray generation is provided. The method includes the act of interleaving one or more X-ray generating bulk structures with one or more thermally-conductive bulk structures to form an interleaved stack. At least one thermal cycle operation is performed on the interleaved stack to fabricate the multi-layer source target. The number of thermal cycle operations is less than the combined number of X-ray generating bulk structures and thermally-conductive bulk structures.

In a further embodiment, a method of fabricating a multi-layer source target for X-ray generation is provided. The method includes the act of interleaving one or more X-ray generating bulk structures with one or more thermally-conductive bulk structures to form an interleaved stack. One thermal cycle operation is performed on the interleaved stack while the interleaved stack is under compression to fabricate the multi-layer source target.

In an additional embodiment, a method of fabricating a multi-layer source target for X-ray generation is provided. The method includes the act of interleaving one or more tungsten bulk structures with one or more diamond bulk structures to form an interleaved stack. At least one thermal cycle operation is performed on the interleaved stack to fabricate the multi-layer source target. The number of thermal cycle operations is less than the combined number of tungsten bulk structures and diamond bulk structures.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
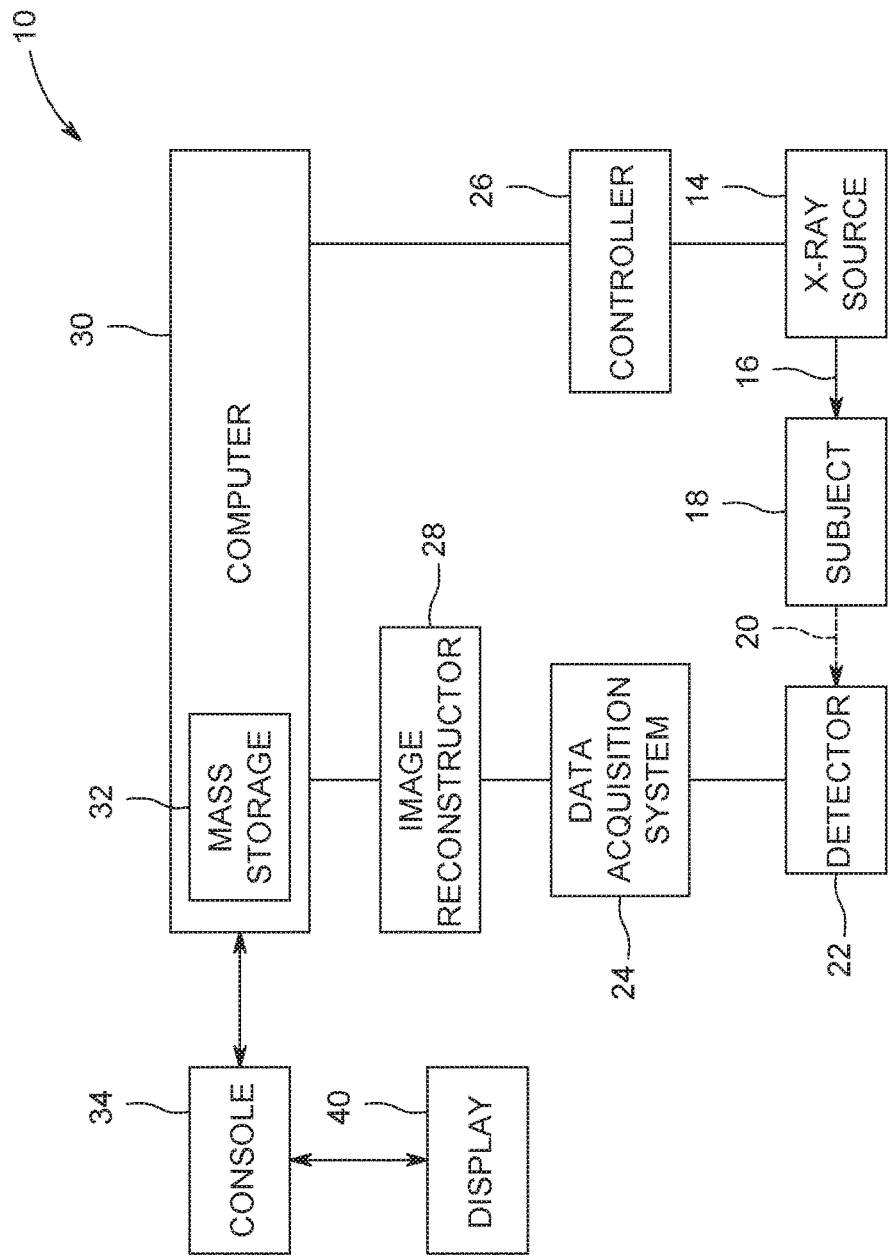
FIG. 1 is a block diagram of an X-ray imaging system, in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As noted above, the X-ray flux produced by an X-ray source may depend on the energy and intensity of an electron beam incident on the source's target region. The energy deposited into the target produces, in addition to the X-ray flux, a large amount of heat. Accordingly, during the normal course of operation, a source target is capable of reaching temperatures that, if not tempered, can damage the target. The temperature rise, to some extent, can be managed by convectively cooling, also referred to as "direct cooling", the target. However, such cooling is macroscopic and does not occur immediately adjacent to the electron beam impact area where damage i.e. melting, can occur. Without microscopic localized cooling, the overall flux of X-rays produced by the source is limited, potentially making the source unsuitable for certain applications, such as those requiring high X-ray flux densities. Rotating the target such that the electron beam distributes the energy over a larger area can reduce the target temperature locally but it typically requires larger evacuated volumes and the additional complexity of rotating components such as bearings. Further, vibrations associated with rotating targets become prohibitive for high resolution applications where the required spot size is on the order of the amplitude of the vibration. Accordingly, it may be desirable if the source could be operated in a substantially continuous basis in a manner that enables the output of high X-ray flux.

One approach for addressing thermal build-up is to use a layered X-ray source having one or more layers of thermal-conduction material (e.g., diamond) disposed in thermal communication with one or more layers of an X-ray generating material (e.g., tungsten). The thermal-conduction materials that are in thermal communication with the X-ray generating materials generally have a higher overall thermal conductivity than the X-ray generating material. The one or more thermal-conduction layers may generally be referred to as "heat-dissipating" or "heat-spreading" layers, as they are generally configured to dissipate or spread heat away from the X-ray generating materials impinged on by the electron beam to enable enhanced cooling efficiency.

Having better thermal conduction within the source target (i.e., anode) allows the end user to operate the source target at higher powers or smaller spot sizes (i.e., higher power densities) while maintaining the source target at the same target operational temperatures. Alternatively, the source target can be maintained at lower temperatures at the same X-ray source power levels, thus increasing the operational lifetime of the source target. The former option translates into higher throughput as higher X-ray source power results in quicker measurement exposure times or improved feature detectability as smaller spot sizes results in smaller features being distinguishable. The latter option results in lower operational (variable) expenses for the end user as targets or tubes (in the case where the target is an integral part of the tube) will be replaced at a lower frequency.

One challenge for implementing such a multi-layered target is fabrication of the multi-layer target structure. In particular, current approaches for forming such a multi-layer structure typically utilize deposition approaches that grow each layer at the atomic level (e.g., chemical vapor deposition, sputtering deposition, and so forth). Such approaches, however, are time consuming and may involve repeated and alternated depositions processes under differing condition.

In contrast, as discussed herein, the current approach utilizes bulk structures to fabricate the multi-layer target structure. For example, in one implementation layers of X-ray generating material (e.g., tungsten) are interleaved with thermally conductive layers (e.g., diamond). To prevent delamination of the layers, various mechanical, chemical, and/or structural approaches may be employed. For example, in certain implementations additional materials or compounds may be introduced to the stack of layers (such as between some or all of the diamond and tungsten layers) to increase the binding strength between layers.

In the presently disclosed approach, instead of the multiple process steps associated with fabrications a multi-layer target structure using deposition techniques (which typically involve a separate process step to form each independent layer), a single thermal cycle and application of compressive load may be used to form the multi-stack target structure. For example a single thermal cycle and application of compressive load may, in one embodiment, be performed to bond, and in some cases inter-diffuse, the parent materials to form an intrinsic bonding layer. Such a reduction in steps from multiple deposition steps to a single thermal cycle and compressive step may reduce the overall processing time for target structure fabrication from multiple weeks to 1-2 days. Depending on the application, the relative stress states of each respective layer can be manipulated by changes in temperature, pressure, presence of interlayers and time, resulting in a more robust structure.

Compressive loading during processing keeps all bulk layers in close contact, and may promote inter-diffusion and growth of new compositional structures known to aid in bonding of the parent layers. This may be helpful to the extent that the elimination of multiple thermal cycles associated with separate deposition steps may lead debonding of the individual layers. Such debonding may be addressed by performing the single thermal cycle under compression.

Multi-layer X-ray sources as discussed herein may be based on a stationary (i.e., non-rotating) anode structure or a rotating anode structure and may be configured for either reflection or transmission X-ray generation. As used herein, a transmission-type arrangement is one in which the X-ray beam is emitted from a surface of the source target opposite the surface that is subjected to the electron beam. Conversely, in a reflection arrangement, the angle at which X-rays leave the source target is typically acutely angled relative to the perpendicular to the source target. This effectively increases the X-ray density in the output beam, while allowing a much larger thermal spot on the source target, thereby decreasing the thermal loading of the target.

By way of an initial example, in one implementation an electron beam passes through a thermally conductive layer (e.g., a diamond layer) and is preferentially absorbed by an underlying X-ray generating (e.g., tungsten) layer. Alternatively, in other implementations an X-ray generating layer may be the first (i.e., top) layer, with a thermally-conductive layer underneath. In both instances, additional alternating layers of X-ray generating and thermally-conductive material may be provided as a stack within the X-ray source target (with either the X-ray generating or thermally-conductive layer on top), with successive alternating layers adding X-ray generation and thermal conduction capacity. As will be appreciated, the thermally conductive and X-ray generating layers do not need to be the same thickness (i.e., height) with respect to the other type of layer or with respect to other layers of the same type. That is, layers of the same type or of different types may differ in thickness from one another. The final layer on the target can be either the X-ray generating layer or the thermally-conductive layer.

With the preceding in mind, and referring to FIG. 1, components of an X-ray imaging system 10 are shown as including an X-ray source 14 that projects a beam of X-rays 16 through a subject 18 (e.g., a patient or an item undergoing security, industrial inspection, or quality control inspection). A beam-shaping component or collimator may also be provided in the system 10 to shape or limit the X-ray beam 16 so as to be suitable for the use of the system 10. It should be noted that the X-ray sources 14 disclosed herein may be used in any suitable imaging context or any other X-ray implementation. By way of example, the system 10 may be, or be part of, a fluoroscopy system, a mammography system, an angiography system, a standard radiographic imaging system, a tomosynthesis or C-arm system, a computed tomography system, and/or a radiation therapy treatment system. Further, the system 10 may not only be applicable to medical imaging contexts, but also to various inspection systems for material characterization, industrial or manufacturing quality control, luggage and/or package inspection, and so on. Accordingly, the subject 18 may be a laboratory sample, (e.g., tissue from a biopsy), a patient, luggage, cargo, manufactured parts, nuclear fuel, or other material of interest.

The subject may, for example, attenuate or refract the incident X-rays 16 and produce the projected X-ray radiation 20 that impacts a detector 22, which is coupled to a data acquisition system 24. It should be noted that the detector 22, while depicted as a single unit, may include one or more detecting units operating independently or in conjunction with one another. The detector 22 senses the projected X-rays 20 that pass through or off of the subject 18, and generates data representative of the radiation 20. The data acquisition system 24, depending on the nature of the data generated at the detector 22, converts the data to digital signals for subsequent processing. Depending on the application, each detector 22 produces an electrical signal that may represent the intensity and/or phase of each projected X-ray beam 20. While the depicted system 10 depicts the use of a detector 22, in certain implementations the produced X-rays 16 may not be used for imaging or other visualization purposes and may instead be used for other purposes, such as radiation treatment of therapy. Thus, in such contexts, no detector 22 or data acquisition subsystems may be provided.

An X-ray controller 26 may govern the operation of the X-ray source 14 and/or the data acquisition system 24. The controller 26 may provide power and timing signals to the X-ray source 14 to control the flux of the X-ray radiation 16, and to control or coordinate with the operation of other system features, such as cooling systems for the X-ray source, image analysis hardware, and so on. In embodiments where the system 10 is an imaging system, an image reconstructor 28 (e.g., hardware configured for reconstruction) may receive sampled and digitized X-ray data from the data acquisition system 24 and perform high-speed reconstruction to generate one or more images representative of different attenuation, differential refraction, or a combination thereof, of the subject 18. The images are applied as an input to a processor-based computer 30 that stores the image in a mass storage device 32.

The computer 30 also receives commands and/or scanning parameters from an operator via a console 34 that has some form of operator interface, such as a keyboard, mouse, voice activated controller, or any other suitable input apparatus. An associated display 40 allows the operator to observe images and other data from the computer 30. The computer 30 uses the operator-supplied commands and parameters to provide control signals and information to the data acquisition system 24 and the X-ray controller 26.

Figure 2:
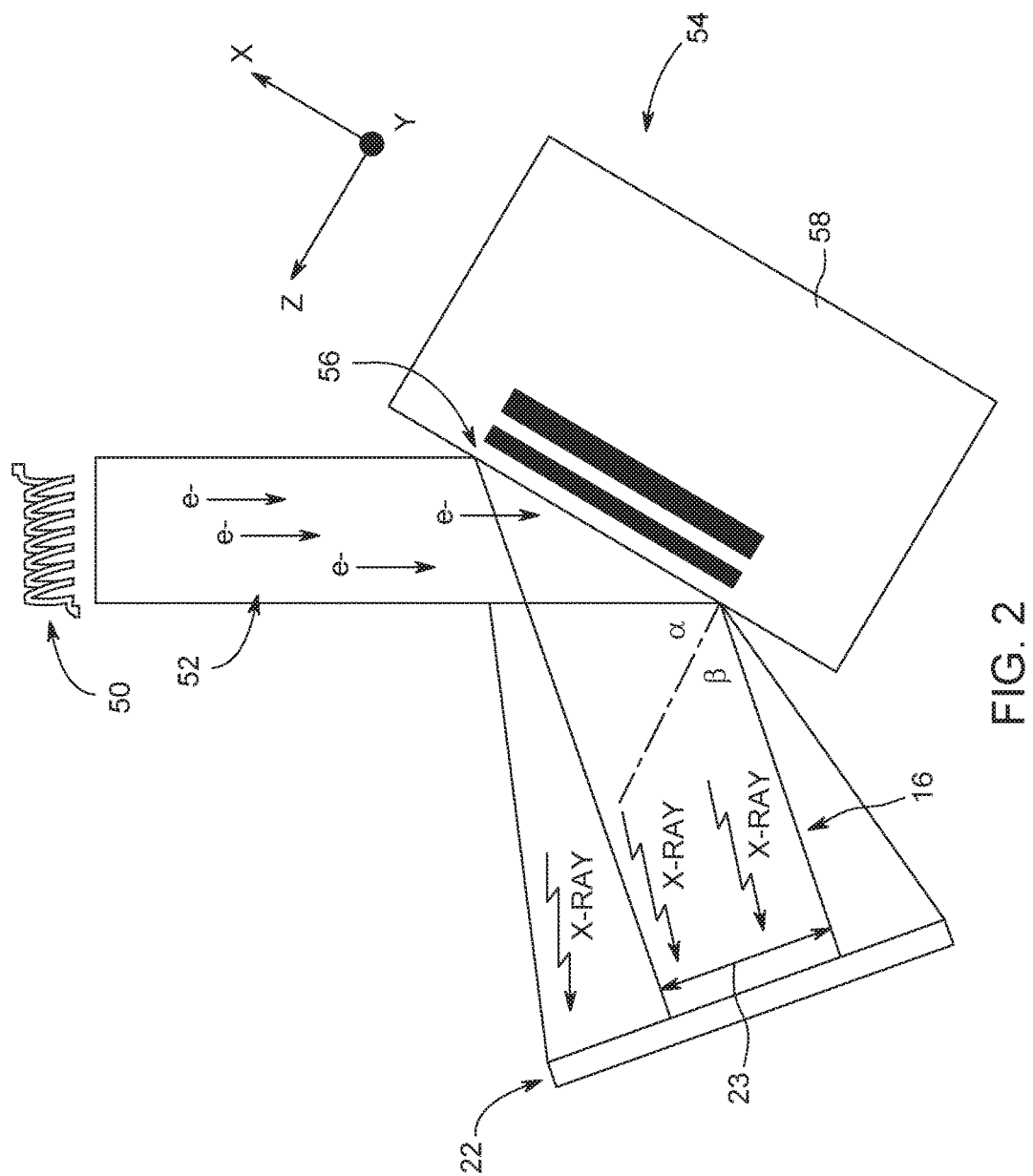
FIG. 2 depicts a generalized view of a multi-layer X-ray source and detector arrangement, in accordance with aspects of the present disclosure.

Referring now to FIG. 2, a high level view of components of an X-ray source 14, along with detector 22, are depicted. The aspects of X-ray generation shown are consistent with a reflective X-ray generation arrangement that may be consistent with either a rotating or stationary anode. In the depicted implementation, an X-ray source includes an electron beam emitter (here depicted as an emitter coil 50) that emits an electron beam 52 toward a target region of X-ray generating material 56. The X-ray generating material may be a high-Z material, such as tungsten, molybdenum, titanium-zirconium-molybdenum alloy (TZM), tungsten-rhenium alloy, copper-tungsten alloy, chromium, iron, cobalt, copper, silver, or any other material or combinations of materials capable of emitting X-rays when bombarded with electrons). The source target may also include one or more thermally-conductive materials, such as substrate 58, or thermally conductive layers or other regions surrounding and/or separating layers of the X-ray generating material 56. As used herein, a region of X-ray generating material 56 is generally described as being an X-ray generating layer of the source target, where the X-ray generating layer has some corresponding thickness, which may vary between different X-ray generating layers within a given source target.

The electron beam 52 incident on the X-ray generating material 56 generates X-rays 16 that are directed toward the detector 22 and which are incident on the detector 22, the optical spot 23 being the area of the focal spot projected onto the detector plane. The electron impact area on the X-ray generating material 56 may define a particular shape, thickness, or aspect ratio on the source target (i.e., anode 54) to achieve particular characteristics of the emitted X-rays 16. For example, the emitted X-ray beam 16 may have a particular size and shape that is related to the size and shape of the electron beam 52 when incident on the X-ray generating material 56. Accordingly, the X-ray beam 16 exits the source target 54 from an X-ray emission area that may be predicted based on the size and shape of the impact area. In the depicted example the angle between the electron beam 52 and the normal to the target is defined as $\alpha$. The angle $\beta$ is the angle between the normal of the detector and the normal to the target. Where b is the thermal focal spot size at the target region 56 and c is optical focal spot size, $b=c/\cos \beta$. Further, in this arrangement, the equivalent target angle is 90-$\beta$.

As discussed herein, certain implementations employ a multi-layer source target 54 having two or more X-ray generating layers in the depth or z-dimension (i.e., two or more layers incorporating the X-ray generating material) separated by respective thermally conductive layers (including top layers and/or substrates 58). A multi-layer source target 54 as discussed herein may be fabricated using bulk structures (e.g., plates, wafers, sheets, and so forth) of the respective layer materials which undergo a reduced number of thermal cycles (e.g., one thermal cycle), potentially while under compression. This is in contrast to prior approaches, where deposition techniques (such as chemical vapor deposition (CVD), sputtering, atomic layer deposition) were typically employed to form each layer separately over an extended time frame.

Referring again to FIG. 2, generally the thermally conductive layers (generally defined in the x,y plane and having depth or elevation in the z-dimension shown) are configured to conduct heat away from the X-ray generating volume during operation. That is, the thermal materials discussed herein have thermal conductivities that are higher than those exhibited by the X-ray generating material. By way of non-limiting example, a thermal-conducting layer may include carbon-based materials including but not limited to highly ordered pyrolytic graphite (HOPG), diamond, and/or metal-based materials such as beryllium oxide, silicon carbide, copper-molybdenum, copper, tungsten-copper alloy, or any combination thereof. Alloyed materials such as silver-diamond may also be used. Table 1 below provides the composition, thermal conductivity, coefficient of thermal expansion (CTE), density, and melting point of several such materials.

TABLE 1

| Material | Composition | Thermal Conductivity W/m-K | CTE ppm/K | Density g/cm$^3$ | Melting point ° C. |
| --- | --- | --- | --- | --- | --- |
| Diamond | Polycrystalline diamond | ≥1800 | 1.5 | 3.5 | NA* |
| Beryllium oxide | BeO | 250 | 7.5 | 2.9 | 2578 |
| CVD SiC | SiC | 250 | 2.4 | 3.2 | 2830 |
| Highly oriented pyrolytic graphite | C | 1700 | 0.5 | 2.25 | NA* |
| Cu—Mo | Cu—Mo | 400 | 7 | 9-10 | 1100 |
| Ag-Diamond | Ag-Diamond | 650 | <6 | 6-6.2 | NA* |
| OFHC | Cu | 390 | 17 | 8.9 | 1350 |

*Diamond or HOPG graphitizes at ~1,500° C., before melting, thus losing the thermal conductivity benefit. In practice, this may be the limiting factor for any atomically ordered carbon material instead of melting.

It should be noted that the different thermally-conductive layers, structures, or regions within a source target 54 may have correspondingly different thermally-conductive compositions, different thicknesses, and/or may be fabricated differently from one another, depending on the respective thermal conduction needs at a given region within the source target 54. However, even when differently composed, such regions, if formed so as to conduct heat from the X-ray generating materials, still constitute thermally-conductive layers (or regions) as used herein. For the purpose of the examples discussed herein, diamond is typically referenced as the thermally-conductive material. It should be appreciated however that such reference is merely employed by way of example and to simplify explanation, and that other suitable thermally-conductive materials, including but not limited to those listed above, may instead be used as a suitable thermally-conductive material.

In various implementations respective depth (in the z-dimension) within the source target 54 may determine the thickness of an X-ray generating layer found at that depth, such as to accommodate the electron beam incident energy expected at that depth. That is, X-ray generating layers or regions at different depths within a source target 54 may be formed so as to have different thicknesses. Similarly, depending on heat conduction requirements at a given depth, the differing thermal-conductive layers may also vary in thickness, either based upon their depth in the source target 54 or for other reasons related to optimizing heat flow and conduction.

Figure 3:
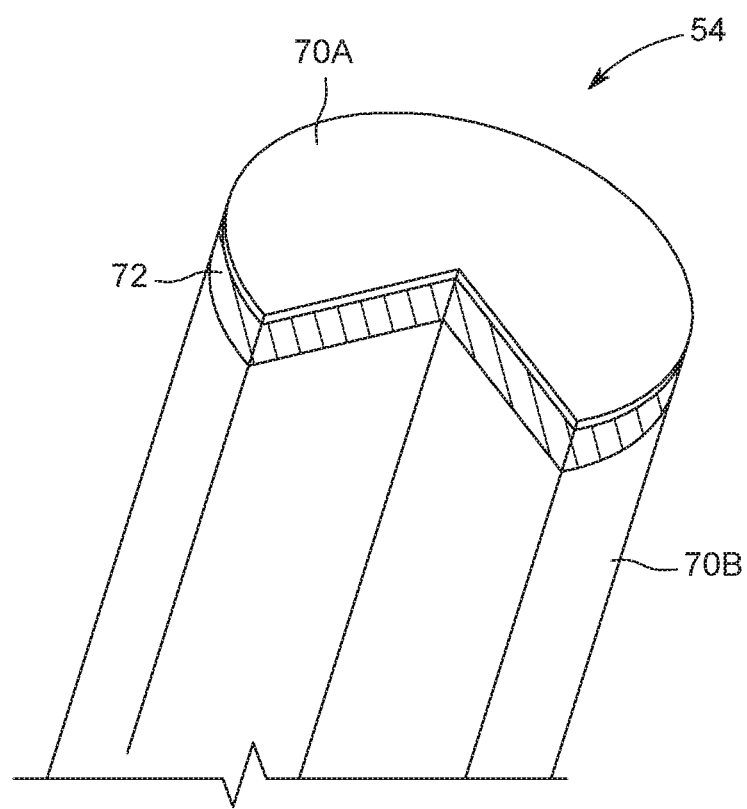
FIG. 3 depicts cut-away perspective view of a layered X-ray source, in accordance with aspects of the present disclosure.
Figure 3:
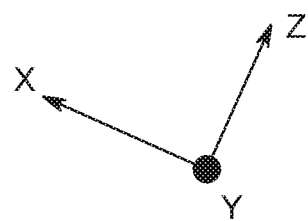

By way of example of these concepts, FIG. 3 depicts a partial-cutaway perspective view of a stationary X-ray source target (i.e., anode) 54 having alternating layers, in the z-dimension, of: (1) a first thermally-conductive layer 70a (such as a thin diamond film, approximately 0 to 15 μm in thickness) on face of the source target 54 to be impacted by the electron beam 52; (2) an X-ray generating layer 72 of X-ray generating material 56 (i.e., a high-Z material, such as a tungsten layer approximately 10 μm to 40 μm in thickness); and (3) a second thermally-conductive layer 70b (such as a diamond layer or substrate approximately 1.2 mm in thickness) underlying the X-ray generating layer 72. It should be noted that, in other implementations, layer (1) is optional and may be omitted (i.e., thickness of 0), making the X-ray generating layer 72 the top layer of the source target 54. In the depicted example, which is shown to provide useful context for the examples to follow, the X-ray generating material within the X-ray generating layer 72 is continuous throughout the layer 72. Further, the example of FIG. 3 depicts a simplified example having only a single X-ray generating layer 72, though the single X-ray generating layer is part of a multi-layer source target 54 in that the X-ray generating layer 72 is sandwiched between two thermal-conduction layers 70a and 70b. As will be appreciated, in other implementations additional layers 72 of X-ray generating material and thermal conduction layers 70 may be present.

Figure 4:
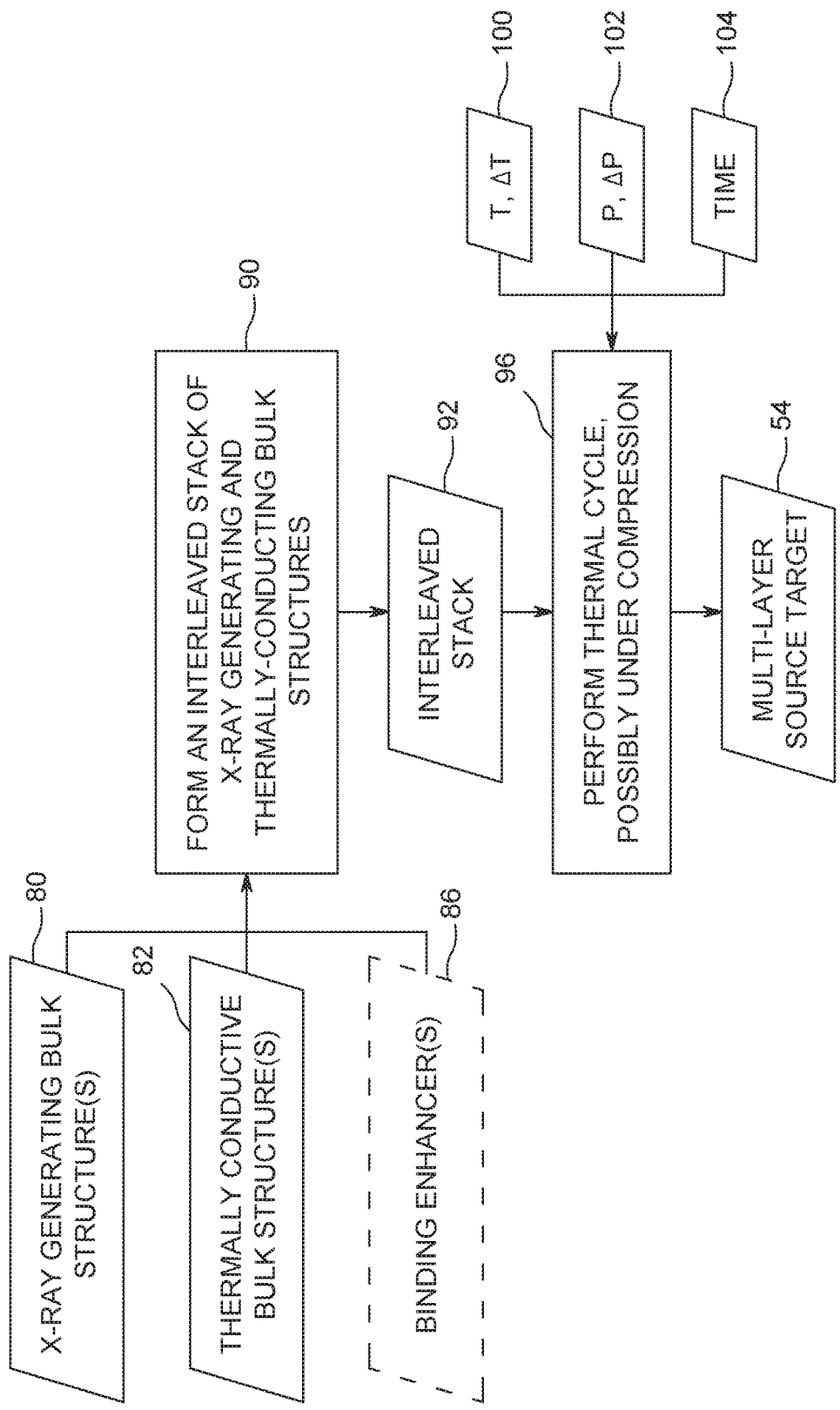
FIG. 4 depicts a process flow showing fabrication of a multi-layer target using bulk structures, in accordance with aspects of the present disclosure.

With the preceding in mind, FIG. 4 depicts a process flow associated with the fabrication of such an X-ray source target 54 using bulk structures (e.g., wafers, sheets, disks, and so forth). For example, in the depicted flow bulk structures 80 formed from an X-ray generating material (e.g., tungsten, molybdenum, tungsten-rhodium, titanium-zirconium-molybdenum alloy (TZM) layer bulk structures, having a thickness of 0.5 μm-50 μm, such as 1 μm-2 μm, 10 μm, or 25 μm) and bulk structures 82 formed from a thermally-conductive material (e.g., diamond layer bulk structures having dimensions of 5 μm-50 μm (such as 30 μm) or less than equal to 10 μm) may be interleaved (block 90) in a stacked arrangement (i.e., interleaved stack 92) corresponding to the desired final structure of the multi-layer source target 54. Optionally, in some implementations one or more binding enhancers 86 (e.g., one or more of active carbon, hydro-carbon, gold, platinum, silver, or copper or, in some implementations, an alloy containing as one constituent the X-ray generating material) may also be provided between some or all of the interleaved X-ray generating and thermally conductive bulk structures 80, 82. In such implementations, the binding enhancers 86 increase binding strength or otherwise facilitate adhesion of the layers of the multi-layer source target 54 after thermal cycling under compression in the fabrication steps.

Once the interleaved stack 92 is assembled one (or an otherwise reduced number) of thermal cycles is performed (block 96) to fabricate the multi-layer source target 54. By way of example, fewer thermal cycles are performed than the number of layers on the multi-layer source target 54 (i.e., there is not a corresponding thermal cycle for each layer of X-ray generating material and thermally-conductive material in the multi-layer source target 54). As noted herein, the thermal cycle operation(s) 96 may be performed under compression to facilitate fabrication of the multi-layer source target 54 and adhesion of the layers. In addition, to prevent oxidation or other undesired chemical reactions, in certain implementations, the thermal cycle operation may be performed in vacuum or near-vacuum conditions (e.g., $2.6 \times 10^{-6}$ Torr) or, alternatively, in the presence of an inert gas).

The thermal cycle and compression operation(s) 96 may be performed under constant or varying conditions and time frames so as to fabricate a source target 54 having the desired properties. Further, to the extent that more than one thermal cycle operation 96 is performed, the separate operations 96 may differ in their parameters and/or profiles. For example, a given thermal cycle operation 96 may be performed at a constant temperature (e.g., a temperature in the range of 700° C.-1500° C.) or may be performed over a varying temperature profile (e.g., an ascending temperature ramp, a descending temperature decline, or an otherwise defined temperature profile over an elapsed time. Such temperature parameters are represented in FIG. 4 as temperature parameters 100.

Similarly, a given thermal cycle operation 96 may be performed under various pressure conditions, including: (1) no pressure (just a thermal cycle); (2) a constant pressure or compression (e.g., a pressure in the range of 1 MPa to 500 MPa (depending on the temperature to account for thermal expansion so as to maintain constant pressure); or (3) a varying pressure or compression profile (e.g., an ascending pressure ramp, a descending pressure decline, or an otherwise defined pressure profile over an elapsed time. Varying pressure may be achieved, in certain implementations, by applying a fixed compression, but allowing thermal expansion to result in increases pressure as the temperature is increased. In one embodiment, pressure is applied via a pneumatic ram or other mechanical pressure force application, with the layered bulk structures held between or under the ram or other device so as to achieve the specified pressure profile. Such pressure or compression parameters are represented in FIG. 4 as pressure parameters 102.

A further parameter that may be specified for the thermal cycle operation(s) 96 is one or more times 104 which, as noted above, may correspond to a total operation time and/or time(s) spent at one or more temperatures 100 and/or pressures 102. In conjunction with one another, these parameters 100, 102, 104, in addition to other application specific parameters, may define the characteristics of the one or more thermal cycle operations 96.

Example fabrication runs in accordance with the preceding discussion are provided below to facilitate explanation.

Example 1

A vacuum thermo-cycling system was prepared by heating to 1200° C. and holding at that temperature for 1 hour at $2.6 \times 10^{-6}$ Torr. Bulk materials used were 25 μm thick tungsten foil, which was cleaned with methanol, and 25 μm thick chemical vapor deposited (CVD) diamond disks having a 10 mm diameter ($\phi$). A stack was formed consisting (from the top down) of: (1) spacers (optional, included in this study due to vacuum chamber and press dimensions); (2) a tungsten disk ($\phi$0.75"×0.0625" thick); (3) 25 μm thick tungsten foil (0.5"×0.5"); (4) 25 μm thick CVD diamond ($\phi$10 mm); (5) 25 μm thick tungsten foil (0.5"×0.5"); and (6) a tungsten disk ($\phi$0.75"×0.0625" thick).

Once this stack was formed, the ram associated with the pressure device was positioned so as to just touch the stack and to hold the stack in position. The chamber was evacuated overnight to $2.6 \times 10^{-6}$ Torr.

Once the specified vacuum conditions were reached a thermal cycle was performed. In this study, the temperature profile of the thermal cycle included ramping the temperature 10° C./minute to 1100° C., holding the temperature at 1100° C. for four hours, and cooling at 10° C./minute.

With respect to the load profile (with a minimum gauge reading equal to 100 pounds), in this study evacuation of the chamber added 70 pounds of load via pressure differential. Only this vacuum load was applied during ramp up and then the jack relief valve was closed. A gauge reading of 100 pounds was reached at 821° C., with maximum load of 1500 pounds reached at 1100° C. (94 MPa) due to thermal expansion of the ram train and sample stack.

The resulting structure exhibited visible regions of tungsten carbide formation at tungsten and diamond interfaces.

Example 2

In a second study, a vacuum thermo-cycling system was prepared by heating to 1200° C. and holding at that temperature for 1 hour at $2.6 \times 10^{-6}$ Torr. Bulk materials used were 25 μm thick tungsten foil and 25 μm thick chemical vapor deposited (CVD) diamond disks having a 10 mm diameter ($\phi$). The tungsten foil was polished on one side using a 1200 grit silicon carbide (SiC) sanding medium to remove tungsten oxide on the polished surface. The tungsten foil was also cleaned with methanol.

A stack was formed consisting (from the top down) of: (1) a compliant, multi-layer graphite sheet (to accommodate misalignment and pressure points); (2) spacers (optional, included in this study due to vacuum chamber and press dimensions); (3) a tungsten disk ($\phi$0.75"×0.0625" thick); (4) 25 μm thick tungsten foil (0.5"×0.5") having one polished side which was face down; (5) 25 μm thick CVD diamond ($\phi$10 mm); (6) 25 μm thick tungsten foil (0.5"×0.5") having one polished side which was face up; (7) a tungsten disk ($\phi$0.75"×0.0625" thick); and (8) a compliant, multi-layer graphite sheet (to accommodate misalignment and pressure points).

Once this stack was formed, the ram associated with the pressure device was positioned so as to just touch the stack and to hold the stack in position. The chamber was evacuated, adding 70 pounds of pressure differential. The vent valve was released after evacuation. The chamber was evacuated overnight to $2.6 \times 10^{-6}$ Torr.

Once the specified vacuum conditions were reached a thermal cycle was performed. In this study, the temperature profile of the thermal cycle included ramping the temperature 10° C./minute to 1100° C., holding the temperature at 1100° C. for four hours, and cooling at 10° C./minute.

With respect to the load profile, a minimum readable load of 170 pounds (i.e., 100 pounds (the minimum gauge reading)+70 pounds (attributable to pressure differential under vacuum)) was applied, equivalent to 10.65 MPa) during the operation. In particular, once the sample was under vacuum and heated to 1100° C., a gauge reading of 100 pounds was applied at temperature and held during the four hour temperature hold. Pressure was released prior to cooling.

Example 3

In a third study, a vacuum thermo-cycling system was prepared by heating to 1200° C. and holding at that temperature for 1 hour at $2.6\times10^{-6}$ Torr. Bulk materials used were 25 μm thick tungsten foil and 25 μm thick chemical vapor deposited (CVD) diamond disks having a 10 mm diameter (ϕ). A portion of the tungsten foil was polished on one side using a 1200 grit silicon carbide (SiC) sanding medium to remove tungsten oxide on the polished surface. The tungsten foil was also cleaned with methanol.

A stack was formed consisting (from the top down) of: (1) a compliant, multi-layer graphite sheet (to accommodate misalignment and pressure points); (2) spacers (optional, included in this study due to vacuum chamber and press dimensions); (3) a tungsten disk (ϕ0.75"×0.0625" thick); (4) 25 μm thick tungsten foil (0.5"×0.5") having one polished side which was face down; (5) 25 μm thick CVD diamond (ϕ10 mm); (6) 25 μm thick tungsten foil (0.5"×0.5") which was solvent (e.g., methanol) cleaned; (7) a tungsten disk (ϕ0.75"×0.0625" thick); and (8) a compliant, multi-layer graphite sheet (to accommodate misalignment and pressure points).

Once this stack was formed, the ram associated with the pressure device was positioned so as to just touch the stack and to hold the stack in position. The chamber was evacuated, adding 70 pounds of pressure differential. The vent valve was released after evacuation. The chamber was evacuated overnight to $2.6\times10^{-6}$ Torr.

Once the specified vacuum conditions were reached a thermal cycle was performed. In this study, the temperature profile of the thermal cycle included ramping the temperature 10° C./minute to 1200° C., holding the temperature at 1200° C. for four hours, and cooling at 10° C./minute.

With respect to the load profile, a minimum readable load of 70 pounds was applied which was attributable to the vacuum. This load increased to 300 pounds at 1200° C. due to thermal expansion of the ram train and stacked materials. This was allowed to settle for two minutes and was increased to 1500 pounds for the remainder of the hold interval, adjusting as needed to maintain 1500 pounds of pressure. The load was allowed to decrease as a function of the system components (i.e., ram train and stack) cooling to room temperature after the hold interval.

The resulting structure exhibited visible regions of tungsten carbide formation at tungsten and diamond interfaces.

Technical effects of the invention include fabrication of a multi-layer X-ray source using bulk structures to fabricate a multi-layer target structure. In one implementation, layers of X-ray generating material are interleaved with thermally conductive layers. To prevent delamination of the layers, various mechanical, chemical, and/or structural approaches may also be employed. For example, in certain implementations additional materials or compounds may be introduced to the stack of layers during fabrication to increase the binding strength between layers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of fabricating a multi-layer source target for X-ray generation, comprising:
   interleaving foils made of X-ray generating material with a layer made of thermally-conductive material to form an interleaved stack wherein the layer of thermally-conductive material is sandwiched between the foils of X-ray generating material; and
   performing one thermal cycle operation on the interleaved stack while directly pressing each of the foils of X-ray generating material with opposing disks of the X-ray generating material to compression bond the interleaved stack into the multi-layer source target.

2. The method of claim 1, wherein the X-ray generating material comprises tungsten, molybdenum, tungsten-rhenium, tungsten-rhodium, molybdenum-rhodium, or titanium-zirconium-molybdenum alloy (TZM).

3. The method of claim 1, wherein the thermally-conductive material comprises diamond.

4. The method of claim 1, further comprising providing one or more binding enhancers between at least one of the foils of the X-ray generating material and the layer of thermally-conductive material.

5. The method of claim 4, wherein the one or more binding enhancers comprise one or more of an alloy containing as one constituent the X-ray generating material, hydro-carbon, active carbon, gold, platinum, silver, or copper.

6. The method of claim 1, wherein the foils made of X-ray generating material have a thickness in the range of 0.5 μm to 50 μm.

7. The method of claim 1, wherein the layer of the thermally-conductive material has a thickness in the range of 5 μm to 50 μm.

8. A method of fabricating a multi-layer source target for X-ray generation, comprising:
   interleaving tungsten foils with a diamond layer to form an interleaved stack wherein the diamond layer is sandwiched between the tungsten foils; and
   performing one thermal cycle operation on the interleaved stack while directly pressing each of the tungsten foils with opposing tungsten disks to compression bond the interleaved stack into the multi-layer source target.

9. The method of claim 8, wherein the tungsten foils have a thickness in the range of 0.5 μm to 50 μm.

10. The method of claim 9, wherein the diamond layer has a thickness in the range of 5 μm to 50 μm.

11. The method of claim 8, further comprising providing one or more binding enhancers between at least one of the tungsten foils and the diamond layer.

* * * * *